United States Patent [19]
DiVincenzo et al.

[11] Patent Number: 5,965,859
[45] Date of Patent: Oct. 12, 1999

[54] AUTOMATED SYSTEM AND METHOD FOR ASSOCIATING IDENTIFICATION DATA WITH IMAGES

[75] Inventors: Joseph P. DiVincenzo; Carl L. Holden; Franklyn R. Smith; Steven Benjamin, all of Rochester; Thomas P. Szumla, Lockport; Richard B. Brolly, Batavia, all of N.Y.

[73] Assignee: Eastman Kodak Company, Rochester, N.Y.

[21] Appl. No.: 08/802,153

[22] Filed: Feb. 19, 1997

[51] Int. Cl.⁶ .............................. G06F 17/00; G06K 5/00
[52] U.S. Cl. ............................................. 235/380; 235/375
[58] Field of Search ...................... 235/486, 492, 235/380, 375

[56] References Cited

U.S. PATENT DOCUMENTS

| | | | |
|---|---|---|---|
| 4,728,978 | 3/1988 | Inoue et al. | 354/289.1 |
| 4,839,837 | 6/1989 | Chang | 364/708 |
| 4,884,092 | 11/1989 | Inoue et al. | 354/289.1 |
| 4,887,115 | 12/1989 | Inoue et al. | 354/289.1 |
| 4,904,853 | 2/1990 | Yokokawa | 235/487 |
| 5,036,344 | 7/1991 | Inoue et al. | 354/106 |
| 5,113,351 | 5/1992 | Bostic | 364/479 |
| 5,134,434 | 7/1992 | Inoue et al. | 354/430 |
| 5,221,838 | 6/1993 | Gutman et al. | 235/379 |
| 5,319,401 | 6/1994 | Hicks | 354/76 |
| 5,329,325 | 7/1994 | McClellan | 354/76 |
| 5,430,276 | 7/1995 | Ohtani et al. | 235/375 |
| 5,477,353 | 12/1995 | Yamasaki | 358/487 |
| 5,508,783 | 4/1996 | Iwagaki et al. | 355/40 |
| 5,512,396 | 4/1996 | Hicks | 430/21 |
| 5,574,533 | 11/1996 | Itoh | 396/639 |

*Primary Examiner*—Thien Minh Le
*Assistant Examiner*—Daniel Sherr
*Attorney, Agent, or Firm*—Peyton C. Watkins

[57] ABSTRACT

A system for automatically associating user-generated data to images, the system comprises a card reading device which receives and recognizes the user-generated data entered directly from manipulation of the terminal by a user. A camera captures an image and receives the data from the card reader device for associating a captured image and the data for forming a labeled image.

19 Claims, 3 Drawing Sheets

AUTOMATED SYSTEM AND METHOD FOR ASSOCIATING IDENTIFICATION DATA WITH IMAGES

FIELD OF THE INVENTION

The invention relates generally to the field of processing digital images and, more particularly, to automatically associating identification data with digital images.

BACKGROUND OF THE RELATED ART

A digital camera typically includes either a removable PCMCIA card or internal memory for storing a plurality of captured images therein. A microphone is disposed on the camera for permitting a user to speak therein for inputting a variety of data, which is also stored in memory. These audio files are typically time stamped and are normally matched or associated with the most recently captured image after the audio file was recorded.

The captured digital images and the audio files are then downloaded into a computer workstation for further processing. In the case of the PCMCIA card, the card is inserted into a drive of the computer and, if internal memory is used, the camera is attached via a cable to the computer and the data is downloaded into the computer memory. The images may then be further processed or enhanced by any suitable software such as "ADOBE PHOTOSHOP" software. An operator at the computer workstation plays the audio files which are used to manually associate the user-generated data to a particular digital image on the computer workstation.

After processing, if any, the images in high resolution form are sent to a server or a printer for storage, and a low resolution form of the images is simultaneously sent to a customer storage device typically residing at a remote location. The customer inputs order information at the customer storage device and this data is then sent to the printer server for printing the images in the desired format as described in the customer order.

In the case of conventional photography, images are captured by a conventional camera, and the exposed film is removed and taken to a photofinisher for printing. A customer order form having a unique identification number is completed and given to the photofinisher for indicating the desired format in which the images are to be printed. The customer retains a portion of the order form with the identification number thereon for identifying the images upon picking up the order.

In the case of professional conventional photography, after capturing an image, a ticket that typically includes a unique identification number is given to the customer for matching the captured images to the particular customer. The customer later returns the ticket to the photographer once the images are printed for submitting an order. In some instances, the customer orders upon receiving the ticket and simply returns the ticket to the photographer once the images are printed in hardcopy form.

Although the presently known and utilized system and method for identifying images to a particular customer is satisfactory, it is not without drawbacks. In the case of digital photography, the operator input of the audio files is obviously time consuming and susceptible to input errors. As for conventional photography, pocket-sized tickets are inconvenient to store and are easily lost.

Consequently, a need exists for improvements in the system and method of identifying images to a particular customer.

SUMMARY OF THE INVENTION

The present invention is directed to overcoming one or more of the problems set forth above. Briefly summarized, according to one aspect of the present invention, the invention resides in a system for automatically associating user-generated data to images comprising: (a) a digital character input terminal which receives and recognizes the user-generated data entered directly from manipulation of the terminal by a user; and (b) a camera for capturing an image and receiving the data from said digital character input terminal for associating a captured image and the data for forming a labeled image.

The above and other objects of the present invention will become more apparent when taken in conjunction with the following description and drawings wherein identical reference numerals have been used, where possible, to designate identical elements that are common to the figures.

It is an object of the present invention to provide an automated system and method for concatenating identification data to image files.

It is also a feature of the present invention to provide a card reader for receiving a unique customer identification associated with a particular image.

It is an advantage of the present invention to provide a user-friendly interface for inputting the customer identification.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

In the following description, a portion of the present invention will be described in the preferred embodiment as a software program. Those skilled in the art will readily recognize that the equivalent of such software may also be constructed in hardware.

Figure 1:
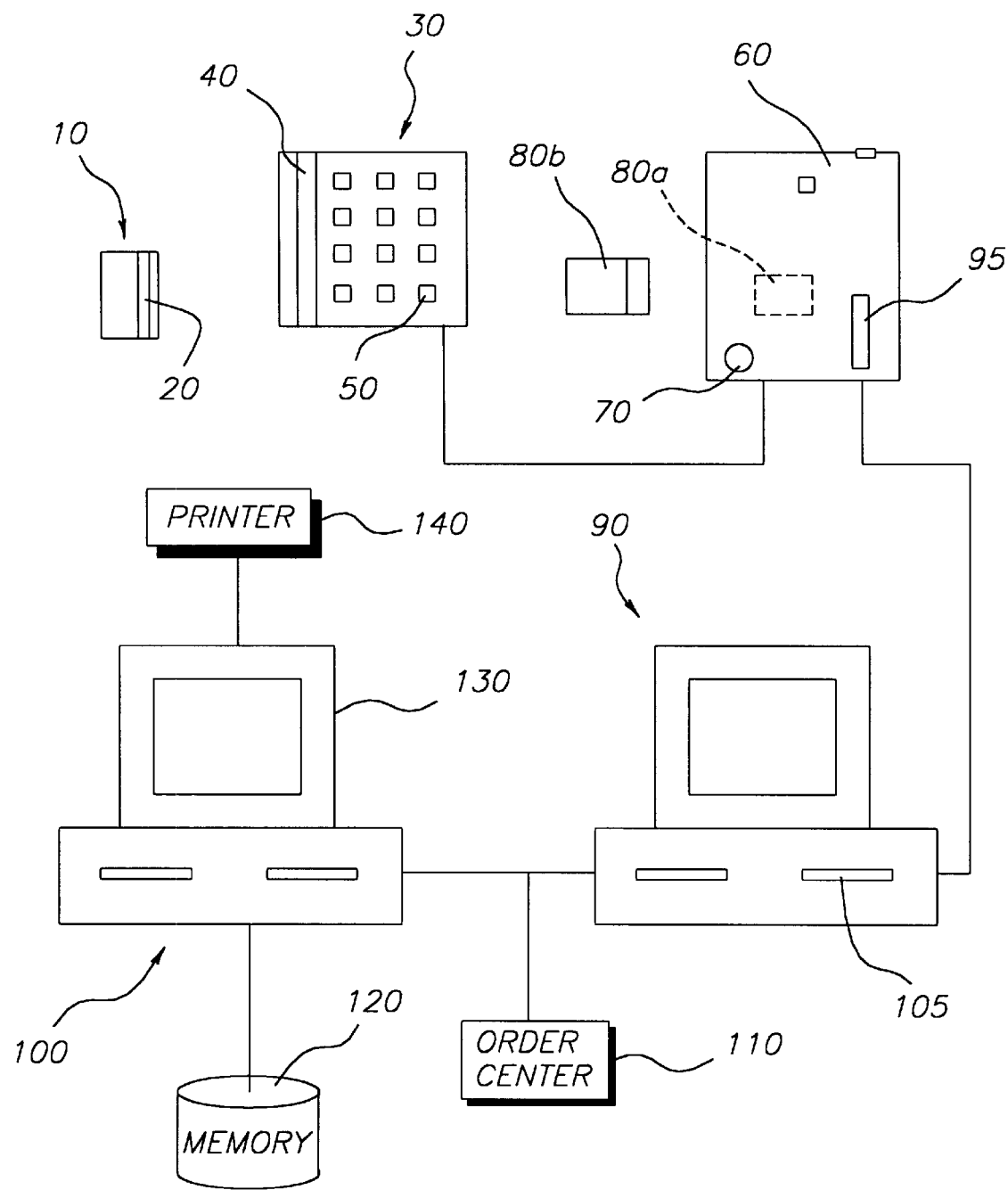
FIG. 1 is a schematic diagram of the present invention.

Referring to FIG. 1, there is illustrated a magnetized card 10 containing data pre-programmed into and stored on a magnetic strip 20 of the card 10. The data may include a plurality of information such information as a unique identification number for uniquely identifying the customer. A card reader 30, such as a MX1 card reader manufactured by Matrix, includes a slot 40 therein for receiving the card 10 for inputting the data from the pre-magnetized card 10 to the card reader 30. The card reader also includes a keypad 50 for inputting information in addition to or in lieu of data from the magnetized card 10.

A digital camera 60 is electrically attached to and receives the data from the card reader 30 via a serial port 70 for storage into memory 80, preferably either in permanently affixed DRAM 80*a* of the camera or a removable and well-known PCMCIA card 80*b* (personal computer memory card international association). The user then captures an image and stores it in the particular memory 80 utilized. The data from the reader 30 is attached to or concatenated to the file containing the captured image for forming a labeled image, and is continuously attached to the file of the most recently captured images until new data is received from the card reader 30 or erased from the memory 80 via a clear button located on the card reader 30.

Figure 2:
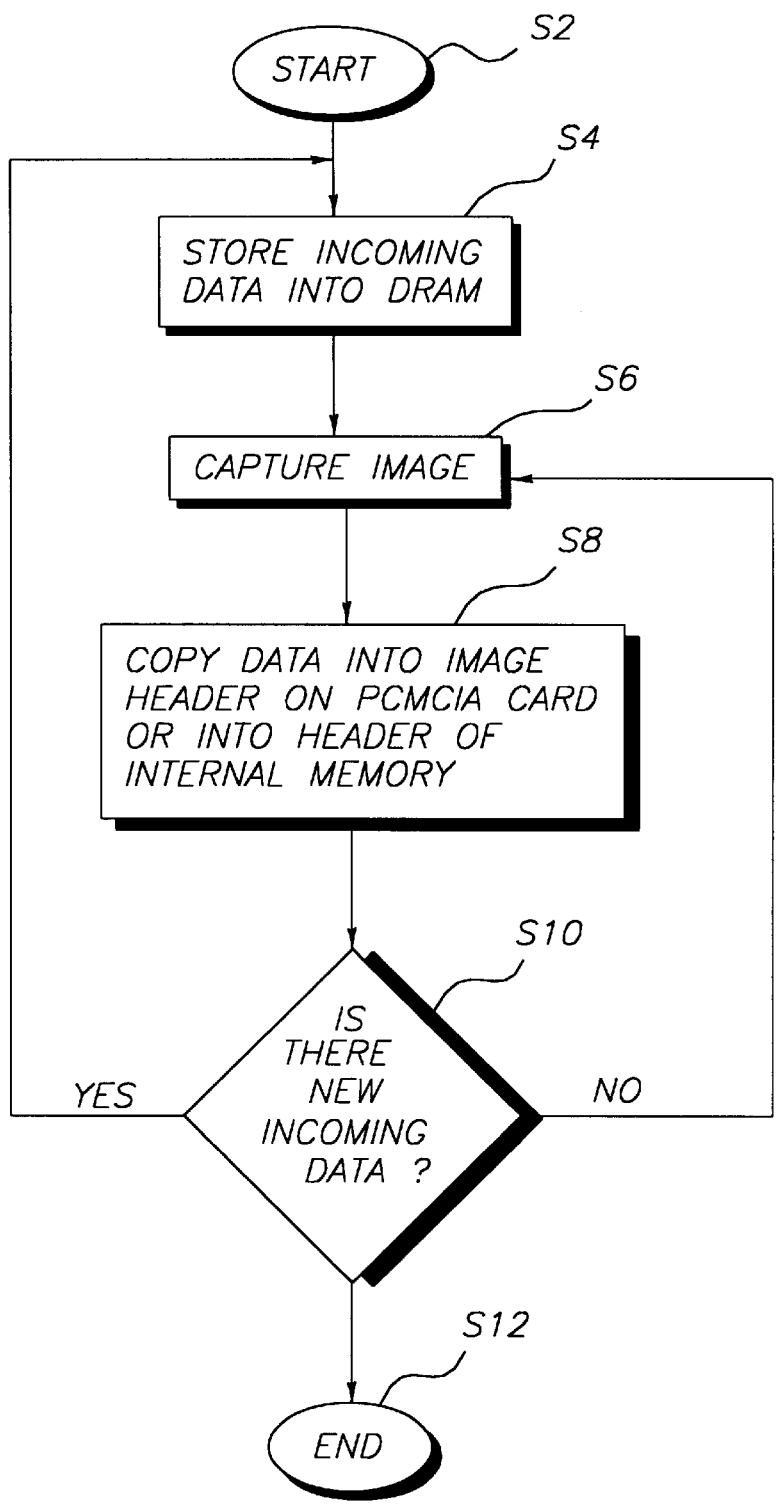
FIG. 2 is a flowchart of a software program of the present invention typically stored in a camera.
Figure 3:
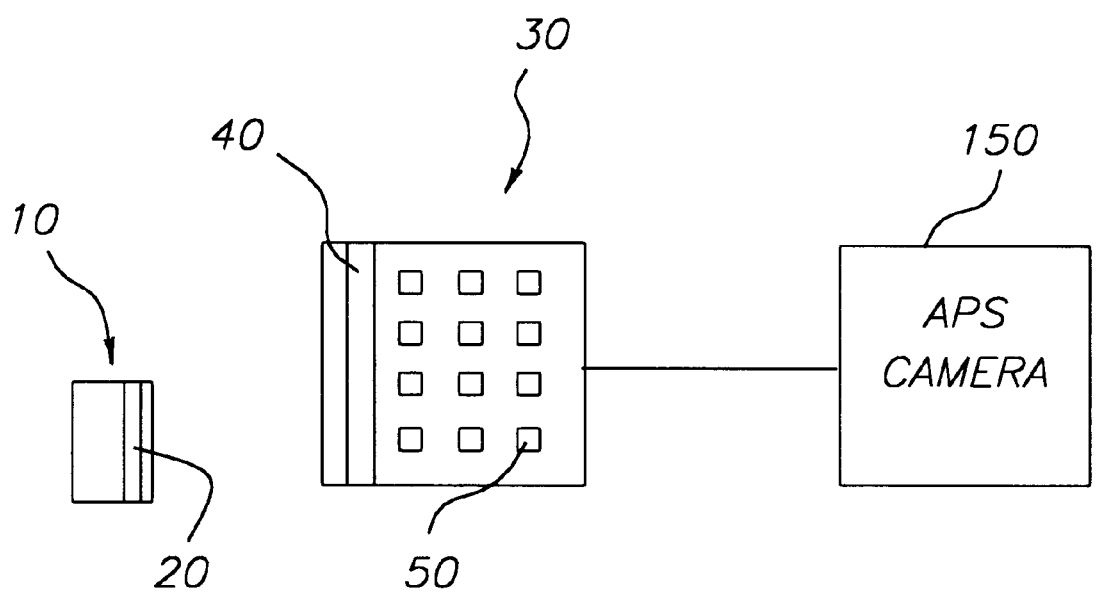
FIG. 3 is an alternative embodiment of FIG. 1.

Referring to FIG. 2, a software program of the present invention is illustrated which is stored on the camera 60 for assisting in implementing the above-described process. In this regard, the software is initiated S2 upon turning on the camera 60 and it then directs any incoming data from the card reader to be stored in DRAM S4. After capture of an image S6, the software continuously inputs or copies S8 the data from memory 80a to the header on the file of the most recently captured image until new incoming data is received S10. The software ceases to run S12 upon de-energizing the camera.

It is instructive to note that the card reader 30 may be an integral part of the camera 60 in lieu of being a separate and distinct device and that the card reader 30 may be substituted with a variety of digital character input terminals such as a digital personal assistant or a portable computer. A digital character input terminal as used herein refers to an input terminal which receives data from a source external to the terminal, such as a card, stylus or even from memory of the user.

Referring back to FIG. 1, an image acquisition station 90 is electrically connected to a SCSI port 95 of the camera 60 or the PCMCIA card 80b from the camera 60 is inserted into a PCMCIA card reader 105 in the image acquisition station 90 for permitting importation of the labeled image or images. An image processing software program, such as ADOBE PHOTOSHOP software, is stored on the image acquisition station 90 for permitting image processing such as sharpening, color adjustments and the like. After such image processing, if any, the operator initiates the image acquisition station to send the digitized representation of the processed image or images to a server 100 and to a retail storage/ordering center 110, typically remotely located. In this regard, a high resolution image with its associated identification is sent to the server 100 and a low resolution with its associated identification is sent to the retail storage/ordering center 110.

At the server 100, the high resolution images and a plurality of creative overlays are stored in memory 120. A creative overlay as used herein is a graphical design which typically functions as a border, as is well known in the art. A creative overlay may be composited on a particular image as indicated on incoming customer orders from the retail storage/ordering center 110. A display 130 and printer 140 are connected to the server 100 for respectively permitting display of a softcopy and hardcopy of the images.

At the retail storage/ordering center 110, the customer inputs an order for a particular image or set of images. Such orders may include size, the number of prints for each image, a creative overlay to be composited on a particular image and the like. The final order is then sent back to the server for printing of the order. It is instructive to note that this order is sent back in a predetermined format for permitting the server 100 to automatically print the desired prints. One such format is the "KODAK" image composite specification standard available from the "KODAK" company in Rochester, N.Y.

The server 100 then performs any processing as indicated by the particular order to the images, such as compositing an overlay, and then prints the images in hardcopy form on the printer 140.

In an alternative embodiment, the digital camera is substituted with an advanced photo system (APS) camera 150. In this case, the images are captured on the film contained in the APS camera and the associated data is stored on a magnetic strip of the film. The film is then taken to a photofinisher for printing. The data on the film is extracted by the photofinisher for permitting the photofinisher to be identified upon returning to pickup the prints.

The invention has been described with reference to a preferred embodiment. However, it will be appreciated that variations and modifications can be effected by a person of ordinary skill in the art without departing from the scope of the invention.

Parts List:

| | |
|---|---|
| 10 | magnetic card |
| 20 | magnetic strip |
| 30 | card reader |
| 40 | slot |
| 50 | keypad |
| 60 | digital camera |
| 70 | serial port |
| 80 | memory |
| 90 | image acquisition center |
| 95 | SCSI port |
| 100 | server |
| 110 | order center |
| 120 | memory |
| 130 | display |
| 140 | printer |

We claim:

1. A system for automatically associating user-generated data to images comprising:
   (a) a card reading device which receives and recognizes the user-generated data entered directly from manipulation of the reader by a user; and
   (b) a digital camera for capturing a plurality of digital images which said camera receives the data from said a card reading device and respectively concatenates the user-directed data, if any, to each digital image as directed by a user.

2. The system as in claim 1 further comprising a print server for receiving and storing the labeled image.

3. The system as in claim 2, wherein said print server produces a digital output from the labeled image as specified by a user order.

4. The system as in claim 3, wherein the user order includes compositing a creative overlay with the labeled image.

5. The system as in claim 1, further comprising an image acquisition station for receiving the labeled images from the camera and sending a high resolution version of the image to said print server.

6. The system as in claim 5, wherein said image acquisition station sends a low resolution image to the customer order station.

7. The system as in claim 1, wherein said card reading device includes a magnetized card for input into the card reader.

8. The system as in claim 1, wherein said camera is a digital camera having memory for storing the capture images.

9. The systems as in claim 8, wherein the memory is either removable memory or internal memory.

10. A method for automatically associating user-generated data to images, the method comprising the steps of:
   (a) receiving and recognizing the user-generated data entered directly from manipulation of a card reading device by a user; and (b) capturing a plurality of images by a digital camera which said camera receives the data from said card reading device and respectively concatenates the user-directed data, if any, to each digital image as directed by a user.

11. The method as in claim 10 further comprising the step of receiving and storing the labeled image by a print server.

12. The method as in claim 11 further comprising producing a digital output from the labeled image as specified by a user order.

13. The method as in claim 12 further comprising compositing a creative overlay with the labeled image.

14. The method as in claim 11 further comprising receiving the labeled images from the camera and sending a high resolution version of the image to the print server.

15. The method as in claim 14 further comprising sending a low resolution image to a customer order station.

16. The method as in claim 10 further comprising inserting a magnetized card for input into the card reader.

17. The method as in claim 10, where step (b) includes capturing the image by a digital camera having memory for storing the captured images.

18. The method as in claim 17 further comprising storing the image in either removable or internal memory.

19. A digital camera for capturing a plurality of still digital images, and for automatically associating user-generated data to the still digital images, the digital camera comprising:

(a) a card reading device which receives and recognizes the user-generated data entered directly from manipulation of the reader by a user; and (b) memory for storing a plurality of the captured still digital images, which said memory receives the data from said card reading device and respectively concatenates the user-directed data, if any, to each digital image as directed by a user.

* * * * *